No. 789,911. PATENTED MAY 16, 1905.
H. K. HITCHCOCK.
APPARATUS FOR MANUFACTURING GLASS SHEETS OR PLATES.
APPLICATION FILED JULY 30, 1902.
2 SHEETS—SHEET 1.
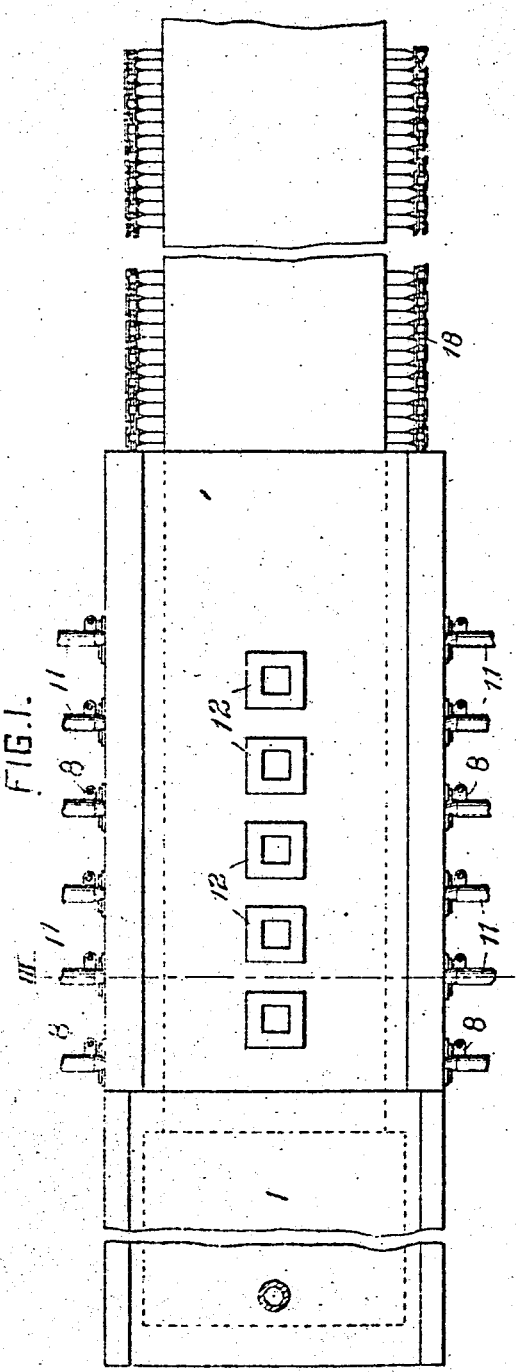
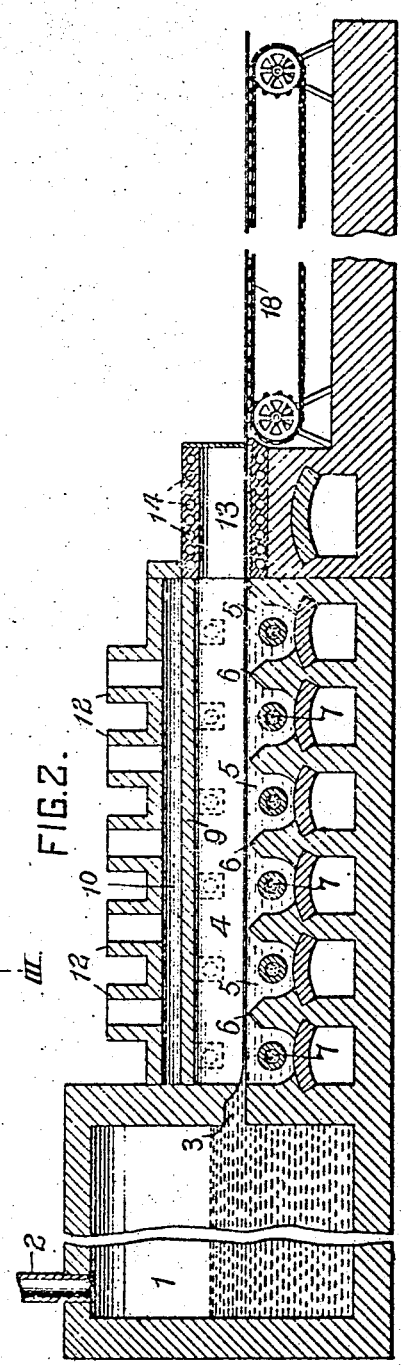
WITNESSES:
INVENTOR No. 789,911. PATENTED MAY 16, 1905.
H. K. HITCHCOCK.
APPARATUS FOR MANUFACTURING GLASS SHEETS OR PLATES.
APPLICATION FILED JULY 30, 1902.

2 SHEETS—SHEET 2.

WITNESSES:
Herbert Bradley
Fred Kirchner

INVENTOR
Halbert K. Hitchcock
by Bannin & Wolcott Att'y.

No. 789,911.

Patented May 16, 1905.

UNITED STATES PATENT OFFICE.

HALBERT K. HITCHCOCK, OF WALTON, PENNSYLVANIA.

APPARATUS FOR MANUFACTURING GLASS SHEETS OR PLATES.

SPECIFICATION forming part of Letters Patent No. 789,911, dated May 16, 1905.

Application filed July 30, 1902. Serial No. 117,640.

*To all whom it may concern:*

Be it known that I, HALBERT K. HITCHCOCK, a citizen of the United States, residing at Walton, in the county of Allegheny and State of Pennsylvania, have invented or discovered certain new and useful Improvements in Apparatus for Manufacturing Glass Sheets or Plates, of which improvements the following is a specification.

The invention described herein relates to certain improvements in the manufacture of sheets or plates of glass, and has for its object the continuous formation of the sheets or plates by subjecting the glass while in a plastic condition to pressure and tension and the progressive annealing of the continuous sheets or plates.

The invention is hereinafter more fully described and claimed.

Figure 3:
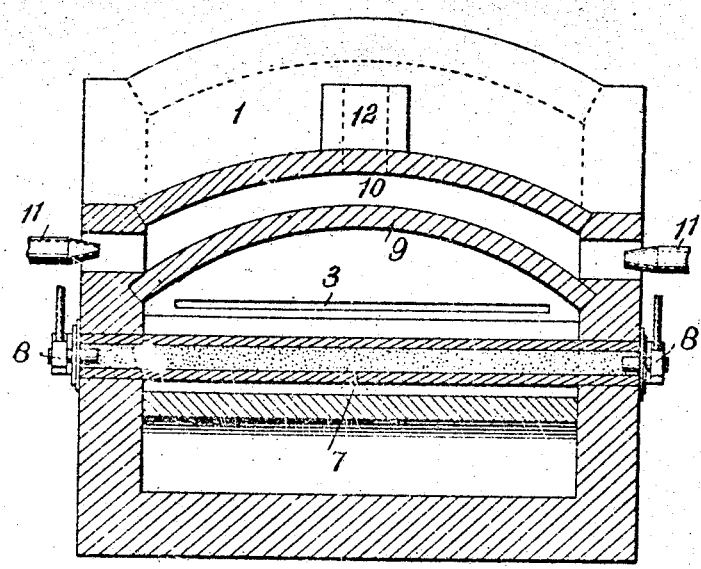
Figure 4:
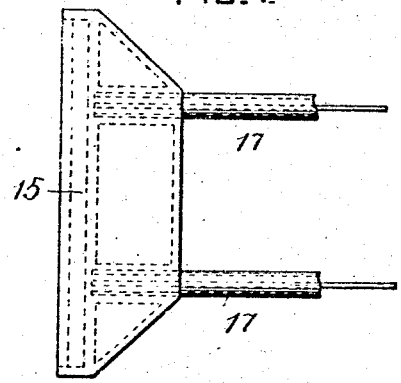
Figure 5:
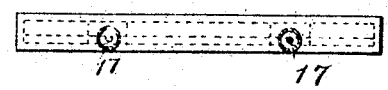
Figure 6:
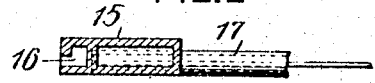

In the accompanying drawings, forming a part of this specification, Figure 1 is a top plan view of the apparatus employed in the practice of my invention. Fig. 2 is a sectional elevation of the same. Fig. 3 is a transverse section on a plane indicated by the line III III, Fig. 1. Figs. 4, 5, and 6 are detail views of the draft-bait.

In the practice of my invention the plastic glass is contained in a chamber 1, which may be a part of a melting-furnace or may be an independent chamber in which the glass is charged and maintained by any suitable means in proper condition of plasticity. The pipe 2 is connected to an exhaust or pressure mechanism, so that the glass may be forced through a slot 3 in the side wall of the furnace at any desired rate of flow. Any suitable means may be employed for forcing the glass through the slot, such as fluid-pressure, caused either by maintaining the glass in the chamber at a higher level than the slot or by maintaining a pressure higher than atmospheric pressure in the chamber. The glass as it flows from the slot enters a chamber 4, in which it is hardened and annealed. The support for the sheet or plate of glass in this chamber consists of a practically continuous liquid bed 5, formed of molten metal, having a melting-point lower than the temperature of the glass sheet or plate and of a specific gravity greater than that of the glass, so that the sheet or plate will float on the surface of the molten metal. In order that the liquid bed may not have any material movement with the sheet or plate, the containing-tank is divided into a series of compartments. The partitions 6 between the compartments extend nearly to the surface of the liquid bed and have their upper edges reduced to nearly knife-edges, as shown in Fig. 2. In addition to preventing any movement of the liquid bed the employment of compartments permits of the use in successive compartments of metal or alloys having successively-lower melting-points, so that as the plate or sheet moves along the bed it will be gradually cooled or annealed by contact with different portions of the liquid bed. Any material movement of the metal from one compartment to another will be prevented by the partitions 6, which, as stated, extend up to nearly in contact with the sheet or plate. The liquid bed is maintained at the desired temperature by any suitable means—such, for example, as that shown, consisting of a case or shell 7, formed of carborundum and containing granulated-carbon cores, having embedded therein terminals 8, connected to a suitable generator.

It is preferred that the chamber 1, in which the glass is maintained in a molten condition, should be separated, as by a curtain-wall, from the chamber 4, in which the glass is shaped and annealed. By thus insulating one chamber from the other the desired temperature can be maintained in each for the steps performed therein—as, for example, it is at times desirable that the glass in chamber 1 should be raised so as to render the glass fluid, and at such times, but for the separation of the chambers, the temperature in chamber 4 would be too great for the proper formation and annealing of the glass.

While not necessary, it is preferred that the arch 9, forming the top of the chamber 4, should be heated and maintained at uniform but successively lower temperature from the front to the discharge end of the chamber. This regulation of the temperatures can be conveniently effected by forming a heating-chamber or chambers 10 above the arch.

Burners 11, connected to a suitable source of supply, project into the lower portions of the chambers, which are provided with outlet-flues 12.

An auxiliary chamber 13, in which the annealing of the sheet or plate is completed, is arranged in the rear of the chamber 4. The liquid bed in the auxiliary chamber is preferably formed of mercury. The temperature of the auxiliary chamber should gradually drop from the front to the discharge end, and such regulation can be effected by any suitable means by causing the circulation of a heated fluid through pipes or passages 14 in the walls of the auxiliary chamber. As shown in Fig. 2, the floor of the chamber 13 is provided with ribs or ridges, which will prevent any such movement of the liquid bed as would tend to produce uniformity of temperature at the ends of the bed.

In the manufacture of sheets or plates it is preferred to employ the method described and claimed in application Serial No. 108,611, filed May 23, 1902, which consists, generally stated, in providing a mother-body of glass adjacent to the slot 3, causing a portion of the mother-body to assume the form of a sheet or plate by tension applied thereto and maintaining an approximately uniform quantity of glass in the mother-body by the regulated flow from the chamber 4. The formation of the sheet or plate occurs in or in proximity to the liquid bed by which the glass is supported until it leaves the chamber and by which the temperature of the sheet or plate will be gradually reduced. In order to apply the formative tension to the glass at the beginning of the operation, I provide a bait 15, having a slot or recess 16, into which the glass from the slot 3 will flow and harden. The bait is provided with handles 17, whereby it can be placed in position in front of the slot 3 and drawn back, pulling the glass with it. During its movements through the chambers 4 and 13 the bait is supported so that its plane of movement will be straight in order not to effect a transverse bending or waving of the glass as it is drawn out. When the metal in chambers has a specific gravity greater than that of the bait, no additional support is required, as the bait will float at a uniform height along the surface of the metal. At the discharge end of the annealing-chamber I provide a driven continuous belt or bed 18, on which the sheet or plate rests. As there will be practically no frictional resistance to the movement of the sheet or plate, the liquid bed forming an antifriction-support for the glass, the adhesion of the sheet or plate to the belt 18 will be sufficient to permit of the belt applying the desired formative tension to the glass, as described.

The metal or alloy employed to form the liquid bed should be of such character as to be inert with respect to the glass, so that the surface in contact therewith will not be injuriously affected.

While I have shown and described the chamber having the liquid bed in connection with a particular means for forming the glass into sheets or plates, it will be understood that such chamber may be used in connection with other means for shaping the glass or independent of any shaping means as an annealing leer or kiln.

It is characteristic of my improvement that the glass from the time it leaves the slot is subjected to a tension which is effective adjacent to the slot to elongate or stretch the glass, thereby reducing it to the desired thickness or gage. The liquid bed serves as an antifriction support for the glass and as a means for gradually reducing its temperature, whereby a thorough annealing of the plate or sheet is effected.

I claim herein as my invention—

1. In an apparatus for manufacturing sheets or plates of glass, the combination of means for causing the glass to assume the desired shape or form and a series of liquid supporting-bodies arranged to receive and support the sheets or plates as formed, substantially as set forth.

2. In an apparatus for manufacturing sheets or plates of glass, the combination of means for causing the glass to assume the desired shape or form, and a series of liquid supporting-bodies of different temperatures arranged to receive and support the sheet or plate as formed, substantially as set forth.

3. In an apparatus for treating sheets or plates of glass, the combination of a chamber having a liquid glass-supporting floor or bed and means for regulating the temperature of different portions of such floor or bed, substantially as set forth.

4. In an apparatus for treating sheets or plates of glass, the combination of a chamber having its floor formed of a series of pockets, bodies of liquid contained in said pockets their surfaces forming a continuous supporting-surface, and means for heating said bodies of liquid, substantially as set forth.

5. In an apparatus for manufacturing sheets or plates of glass, the combination of a glass-receptacle having an outlet, means for forcing the glass through the outlet, means for applying a formative tension to the glass as it exudes from the outlet, and a liquid bed for supporting the sheet or plate of glass when formed, substantially as set forth.

6. In an apparatus for manufacturing sheets or plates of glass, the combination of a glass-receptacle having a slot, means for forcing the glass through the slot, means for applying a formative tension to the glass as it exudes from the slot and a liquid bed progressively reduced in temperature for supporting and annealing the sheet or plate.

7. In an apparatus for manufacturing sheets or plates of glass, the combination of a chamber in which the sheets or plates are formed and annealed, and means for subjecting the upper and under sides of the sheet to a corresponding gradually-reduced temperature as it passes through said chamber, substantially as set forth.

8. An apparatus for manufacturing sheets or plates having in combination a glass-receptacle, a glass-shaping chamber insulated as against heat from the glass-receptacle, a glass-supply connecting the receptacle, and shaping-chamber, and means for maintaining a regulated temperature in the glass-shaping chamber, substantially as set forth.

9. An apparatus for manufacturing sheets or plates, having in combination a glass-receptacle, a glass-shaping chamber connected to the receptacle, a bait for drawing the glass through the shaping-chamber, and means for supporting the bait in its movements, thereby avoiding the formation of bends or waves in the sheet or plate, substantially as set forth.

In testimony whereof I have hereunto set my hand.

HALBERT K. HITCHCOCK.

Witnesses:
DARWIN S. WOLCOTT,
F. E. GAITHER.